United States Patent

Baur et al.

[15] 3,637,161

[45] Jan. 25, 1972

[54] MAGNETIC TAPE TRANSPORT SYSTEM

[72] Inventors: Kenneth R. Baur, Halesite; Robert W. Meihofer, Brookhaven, both of N.Y.

[73] Assignees: Magnetic Recording Systems, Inc., Westbury, N.Y.; Infotec, Inc., Plainview, N.Y.

[22] Filed: May 12, 1970

[21] Appl. No.: 36,625

[52] U.S. Cl. ................................242/186, 226/30, 242/209

[51] Int. Cl. ................B65h 59/38, G03b 1/04, G11b 15/32

[58] Field of Search .........................242/186–190, 206–210; 318/7, 68, 69; 226/30, 31

[56] References Cited

UNITED STATES PATENTS

| | | | |
|---|---|---|---|
| 2,656,129 | 10/1953 | De Turk et al. | 242/190 |
| 2,909,337 | 10/1959 | Lahti et al. | 242/208 X |
| 3,007,368 | 11/1961 | Rosenblum | 242/189 X |
| 3,217,996 | 11/1965 | Bernier | 242/201 X |

*Primary Examiner*—Leonard D. Christian
*Attorney*—Kenyon & Kenyon Reilly Carr & Chapin

[57] ABSTRACT

A tape transport system having a freely slidable carriage assembly to isolate the movement of a loop of tape under capstan control from the movement of the remainder of the tape under control of the reel motors. Sensing means are disposed adjacent the carriage assembly to continuously generate a signal in accordance with the position thereof. In normal forward mode or normal reverse mode, a capstan motor drives the tape within the loop past a magnetic head assembly in accordance with read or write speed requirements. A servocontrol system responsive to the carriage position signal regulates the speed of the reel motors so that the carriage tends to recenter. A fast rewind mode is also provided wherein the tape is rewound by the reel motors at a very high speed. In this mode a servocontrol system responsive to the carriage position signal regulates the speed of the capstan motor so that the carriage again tends to recenter. Additionally, means are provided to sense variations in the length of tape between the tape reels and the tape loop with the generated signal controlling the reel motor torques.

40 Claims, 13 Drawing Figures

INVENTORS
KENNETH R. BAUR
ROBERT W. MEIHOFER
BY
Kenyon & Kenyon Reilly Carr & Chapin
ATTORNEYS INVENTORS
KENNETH R. BAUR
ROBERT W. MEIHOFER
BY
Kenyon & Kenyon Reilly Carr & Chapin
ATTORNEYS INVENTORS
KENNETH R. BAUR
ROBERT W. MEIHOFER
BY
Kenyon & Kenyon Reilly Carr & Chapin
ATTORNEYS INVENTORS
KENNETH R. BAUR
ROBERT W. MEIHOFER
BY
Kenyon & Kenyon Reilly Carr & Chapin
ATTORNEYS INVENTORS
KENNETH R. BAUR
ROBERT W. MEIHOFER
BY
Kenyon & Kenyon Reilly Carr & Chapin
ATTORNEYS INVENTORS
KENNETH R. BAUR
ROBERT W. MEIHOFER
Kenyon & Kenyon Reilly Carr & Chapin
ATTORNEYS

MAGNETIC TAPE TRANSPORT SYSTEM

BACKGROUND OF THE INVENTION

This invention relates generally to magnetic tape transport systems and more particularly to one which is compatible with high-speed electronic data-processing equipment.

Tape transports for use in connection with electronic computer systems must be capable of transporting tape through a magnetic head assembly at a very high and precisely regulated speed. The tape transport must also be capable of nearly instantaneously starting or stopping the tape at the head assembly. To quickly start or stop the high inertia reels would require vary massive and highly expensive reel motors and power drive circuits. It has long been recognized that it is far cheaper and more desirable to provide a tape buffer between each reel and the head assembly, so that the length of tape between the buffers may be quickly and easily accelerated by a capstan drive. Tape is thus taken from one buffer and quickly transported through the head assembly to the other buffer. A sensor is associated with each buffer to detect the supply of tape in the buffer and an individual servosystem regulates the reel drive motor associated with each buffer to maintain the appropriate supply of tape in each buffer. The reels may thus be accelerated and decelerated more slowly than the capstan drive since the one buffer supplies any tape deficiency and the other buffer stores any tape excess until the reels catch up and restore the balance.

One such system provides tape storage by looping the tape over two spring-loaded pivotally movable arms disposed on opposite sides of the head assembly. Another system stores tape in two vacuum columns arranged on opposite sides of the head assembly. The two buffer functions have also been combined in the form of a movable carriage that may be free sliding or spring loaded. All these buffers work well at low capstan accelerations. At high accelerations, however, these systems generally provide poor tape tension regulation resulting in a high danger of stretching or breaking the tape. The vacuum column buffer system works reasonably well at high accelerations, but the system is complicated, expensive, failure prone and not very compact.

SUMMARY OF THE INVENTION

A tape transport is disclosed which uses a slidable carriage buffer assembly. Tape from the supply reel is directed to the carriage by an idler. At the carriage the tape is turned back approximately 180° by a rotatable idler mounted on one end of the carriage. It then threads approximately 180° around a capstan, through the magnetic head assembly, and 180° around a second capstan back toward the other end of the carriage where it passes 180° around a second rotatable idler mounted on that end of the carriage. The tape finally passes around an idler that directs it to the takeup reel.

If the reels were held from turning and the capstans were slowly rotated, the carriage assembly would slide to one side thus supplying the tape demanded by the capstans by allowing the tape segments leading to and coming from the carriage-mounted idler on that side of the carriage to shorten. Simultaneously, the carriage movement would take up the same amount of tape on the other side of the carriage by lengthening the tape segments leading to and coming from the other idler on that side of the carriage.

The movement of the carriage uncouples the movement of tape in the capstan loop from the movement of tape at the reels. Since the same amount of tape is always stretched between the two reels, tape is not actually stored and the length of tape in the entire system may be regulated through the reels by the reel drive motors. During dynamic operation, the carriage allows the reels to lag or lead the capstan loop by any amount of tape within the carriage travel limits. A photocell sensor is provided which senses the position of the carriage. Another sensor, a pivoted arm, in contact with the tape senses variations in the length of tape between the reels and the loop under constant tension. The other sensor does not sense tension but insures constant tension in the system by applying a constant force to the tape over the range of travel of the arm. The position of the sensor is an indication of the total length of tape in the system and the servo acts to maintain this length at a constant value. Small changes in the length which occur in extreme dynamic conditions are absorbed by motion of the arm without introducing any significant tension changes. This intelligence is used by a multiloop servosystem to regulate the reel drive motors to hold the carriage within travel limits and the tape length at a near constant level even during extreme acceleration or deceleration transients.

A high-speed rewind mode is provided where the capstan motor speed is also regulated by a control system that responds to the sensed carriage position.

In one embodiment, the movable carriage is slidably mounted on a polished cylindrical guide bar with the carriage including a pair of oppositely disposed roller or pulley members. The tape is looped about each of these roller members in a manner which tends to cause the tape to pull the carriage in opposite directions. Disposed adjacent one side of the carriage is a source of light. Two photoelectric cells are positioned on the other side of the carriage to detect an interruption of light by the carriage and thereby to detect the position of the carriage. The photoelectric cell is connected to the tape supply and takeup drive means through a servosystem with the result that the signal generated by the photocells in response to the carriage position controls the supply and takeup of tape in accordance with the tape requirements of the capstan driven tape loop.

The tape length sensing means is provided between the magnetic head assembly and the takeup reel. Such tape length sensing means is connected to the tape supply and takeup reel drive means in order to regulate the differential torque thereof and thereby control the amount of tape maintained in the system between the reels and the tape loop. A pivotable arm has the tape disposed thereacross such that it is pivoted in accordance with the amount of tape between the reels and the loop. A spring or other resilient means is coupled to the arm and moves in conjunction therewith. Another photoelectric sensing means disposed adjacent the spring detects the movements of the arm. The sensing means is connected to the tape supply and takeup reel drive means to change the torque thereof in opposite senses. In this manner, the amount of tape is controlled in accordance with the signal generated at the photoelectric sensing means.

Accordingly, it is an object of this invention to provide an improved magnetic tape transport system compatible with high-speed data-processing equipment.

It is another object of this invention to provide a magnetic tape transport system adapted to accommodate rapid acceleration and deceleration of the tape passing through the magnetic head.

It is still another object of this invention to provide a novel flexible tape-coupling apparatus and sensing means which control the supply and takeup of tape.

It is still another object of this invention to provide a novel fast rewind mode that does not require the capstans to be operably disengaged.

These and other objects, advantages and features of the invention will become more apparent from the following description and the accompanying drawings.

BRIEF DESCRIPTION OF THE DRAWINGS

FIG. 3 is a fragmentary perspective view of the carriage assembly and tape length sensing means;

DESCRIPTION OF THE PREFERRED EMBODIMENT

TAPE TRANSPORT SYSTEM

Figure 1:
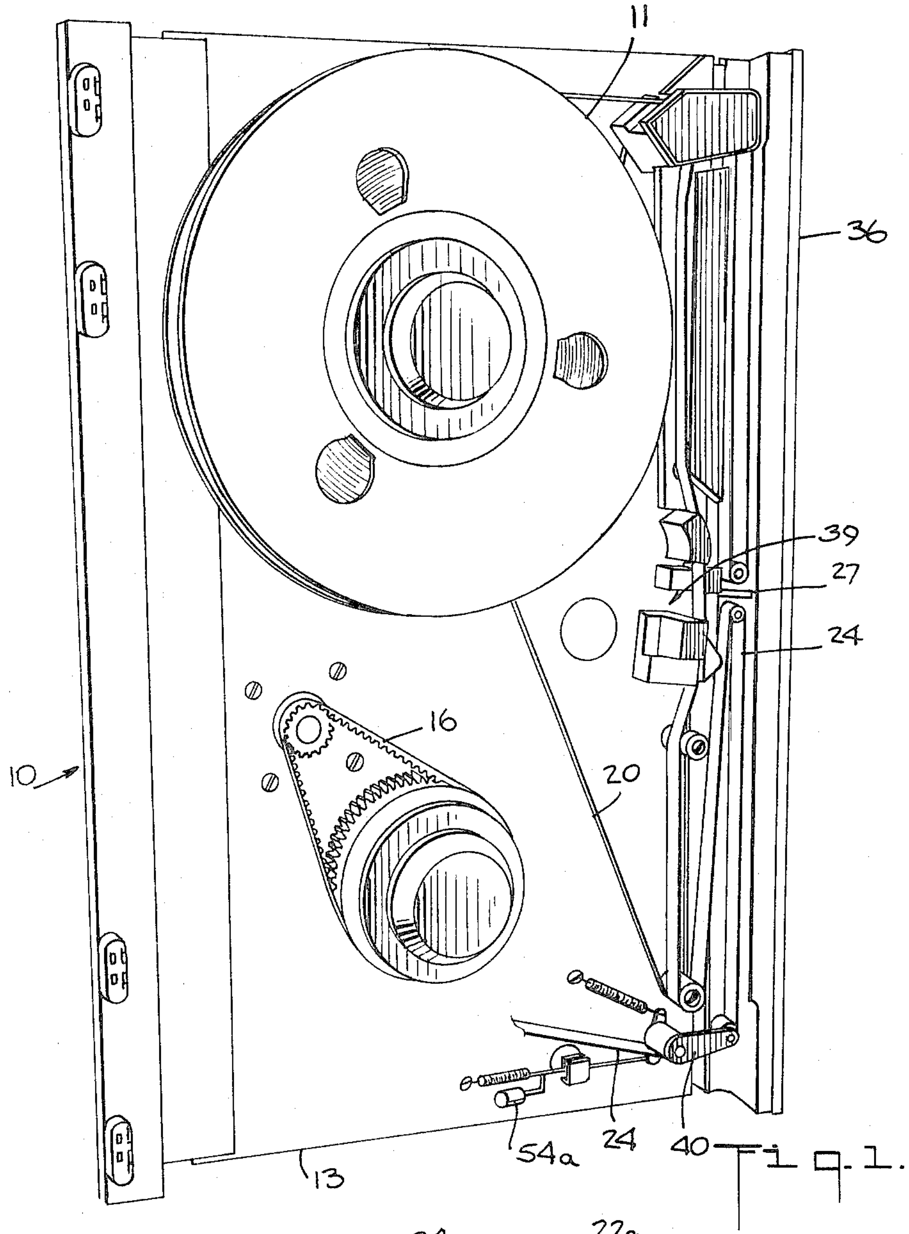
FIG. 1 is a perspective view of the front portion of the magnetic tape transport of this invention.
Figure 2:
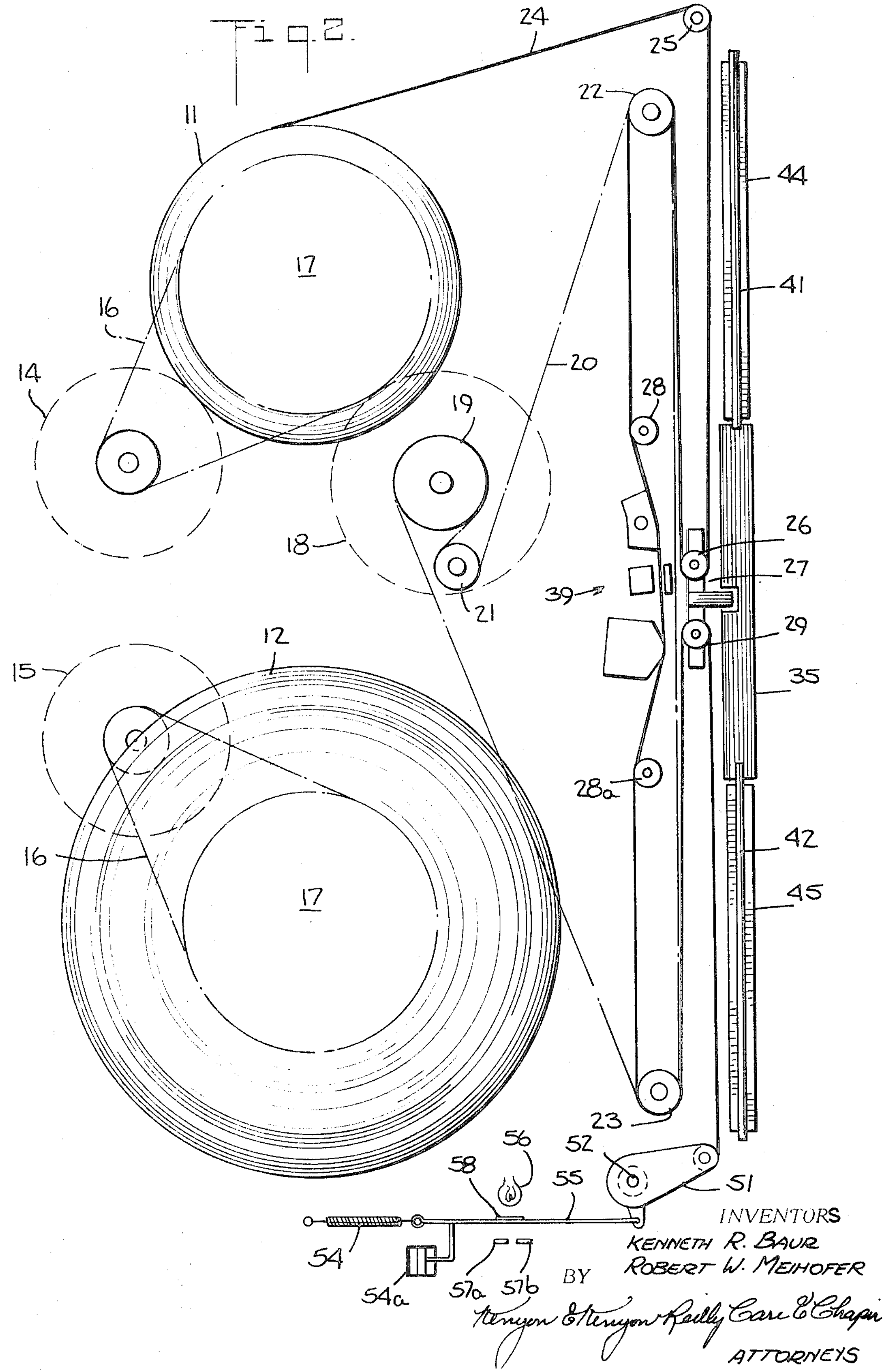
FIG. 2 is a schematic plan view of the tape-routing and capstan drive means.

With reference to the drawings, particularly FIGS. 1–3, the tape transport assembly 10 includes an upper tape or supply reel 11 and a lower tape or takeup reel 12 mounted on a baseplate 13. Each of the tape reels 12 and 13 is adapted to rotate clockwise or counterclockwise, depending upon the operating mode, and is driven by a separate DC-operated motor 14 or 15. Both drive motors are identically coupled to the reel-mounted surface 17 by the serrated belt 16.

Figure 10:
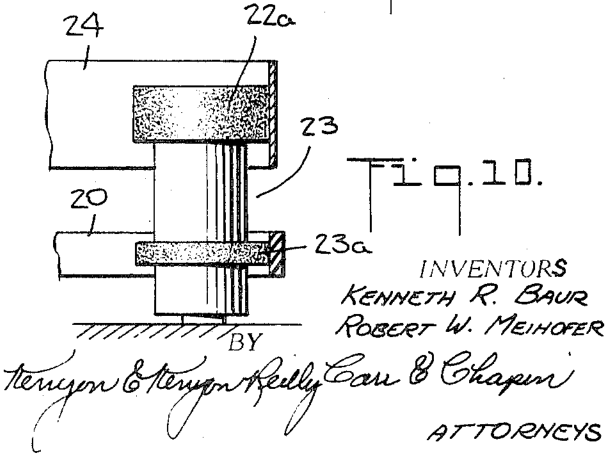
FIG. 10 is an enlarged horizontal section view of the capstan assembly taken along the line 10—10 of FIG. 3.

The capstan drive motor 18 has its output shaft 18*a* driving the pulley 19 which contains disposed thereabout an endless belt 20 which can be formed of polyester material such as mylar material. The endless belt is wound about the fixed idler 21 and the capstan assemblies 22 and 23 in the manner illustrated in FIG. 2. Endless belt 20 is preferably looped about the inner half of the capstan assemblies 22 and 23 at 22*a* and 23*a* respectively (FIG. 10). In this manner, the pair of capstan drives 22 and 23 provide approximately a 300° gripping surface of the drive belt 20. The outer portion of each capstan assembly 22 and 23 has the magnetic tape 24 looped thereabout. In this manner, drive motor 18 by means of the endless belt 20 coupled to each of the capstan assemblies 22 and 23 provides a direct drive for the tape 24 in each of the different operating modes. Each pulley is narrower than the tape or belt in order that the tape or belt is retained thereon by extending beyond the rims of the pulleys. Since both pulleys are on one side of the bearing, both pulleys can be machined together. Thereby the accuracy of pulleys with respect to diameter and concentricity can be maintained.

Tape 24 is routed from the upper storage reel 11, over an idler 25, and then downwardly over the rotatable idler 26 mounted on the carriage assembly 27 (FIG. 2). Tape 24 is next routed upwardly over the capstan drive assembly 22 and again downwardly through the magnetic head assembly 39, being guided thereinto by idler 28. The tape is continued downward, being directed by tape guides 28*a* over the other capstan assembly 23. The routing is then upward over the other rotatable idler 29 on the carriage assembly 27, then downward over the tension-sensing idler 40, and onto the takeup reel 12.

Figures 4, 5, 6, 7, 8:
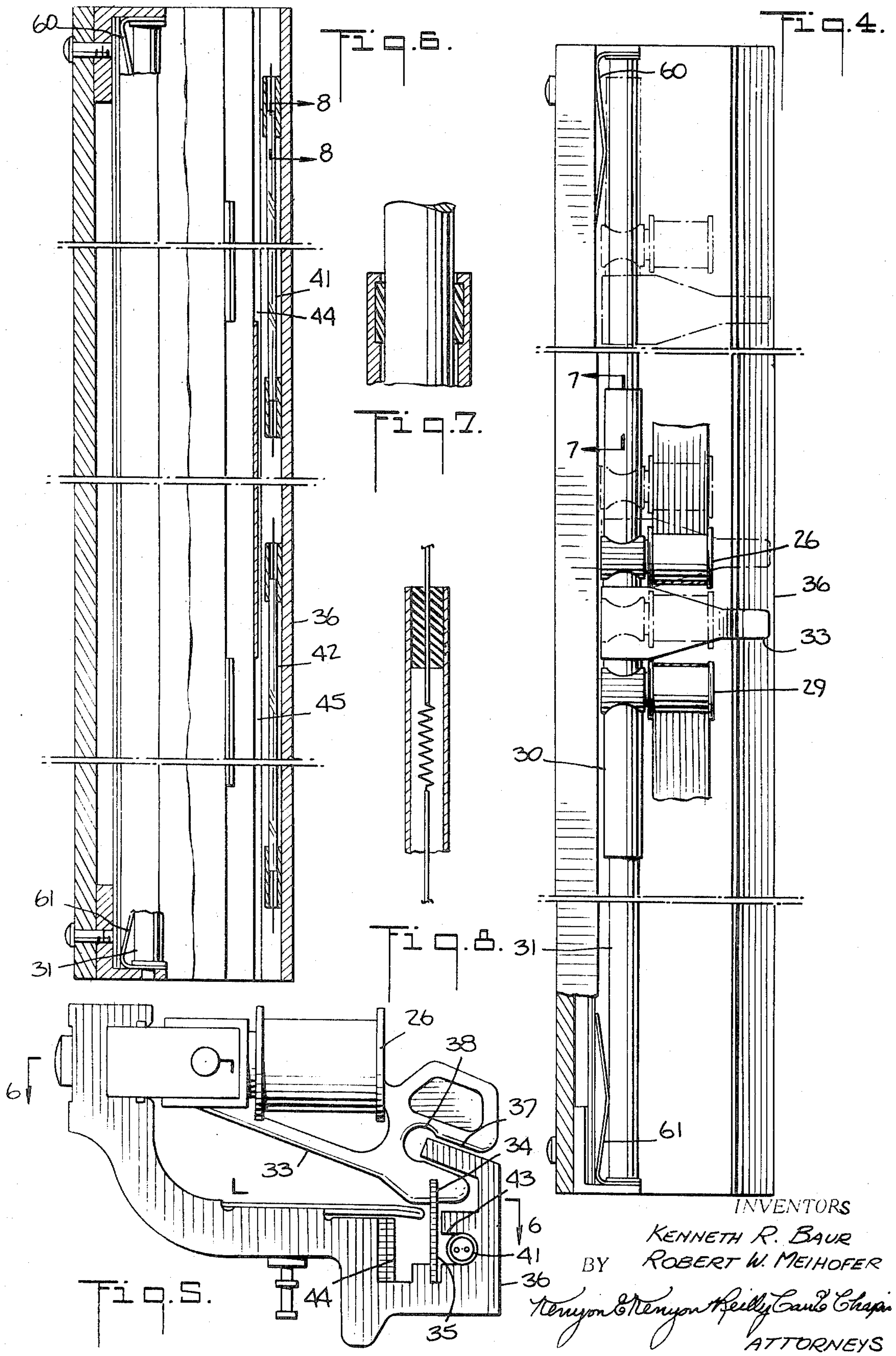
FIG. 4 is a front elevational view partly in section of the carriage and sensing assembly.
FIG. 5 is a plan view of the carriage and sensing assembly.
FIG. 6 is a vertical section view taken along the line 6—6 of FIG. 5 and further showing the sensing assembly.
FIG. 7 is an enlarged vertical section view taken along the line 7—7 of FIG. 4 illustrating the carriage assembly mounted on the guide member.

The carriage assembly 27 includes a hollow sleeve 30 which is slidably mounted on the polished cylindrical rod 31 (FIGS. 3 and 4). Within the hollow sleeve 30, at each end of the carriage assembly, is a bearing 32 which is preferably of a resin-bearing material such as Rulon resin materials (FIG. 7). As a result of the use of the Rulon material bearings 32 and the polished cylindrical rod 31, carriage assembly 27 moves freely along the rod without any substantial amount of friction on either side of the magnetic head assembly 39 (FIG. 3).

The tape forces are applied near the C.G. of the carriage and, therefore, tend to minimize friction forces on the guide rod during dynamic conditions.

At the center of the carriage assembly 27 there is an arm, 33 (FIG. 5). Shutter member 35 contains a slot which enjoys the shutter to the arm; the function of this is more fully described hereinafter. Arm 33 of the carriage assembly is guided along the frame 36 by means of a flange 37 extending into the slot 38 of arm 33. The carriage assembly 27 thereby is free to slide up and down on the guide bar 31 without any rotational movement thereof.

Figure 8:
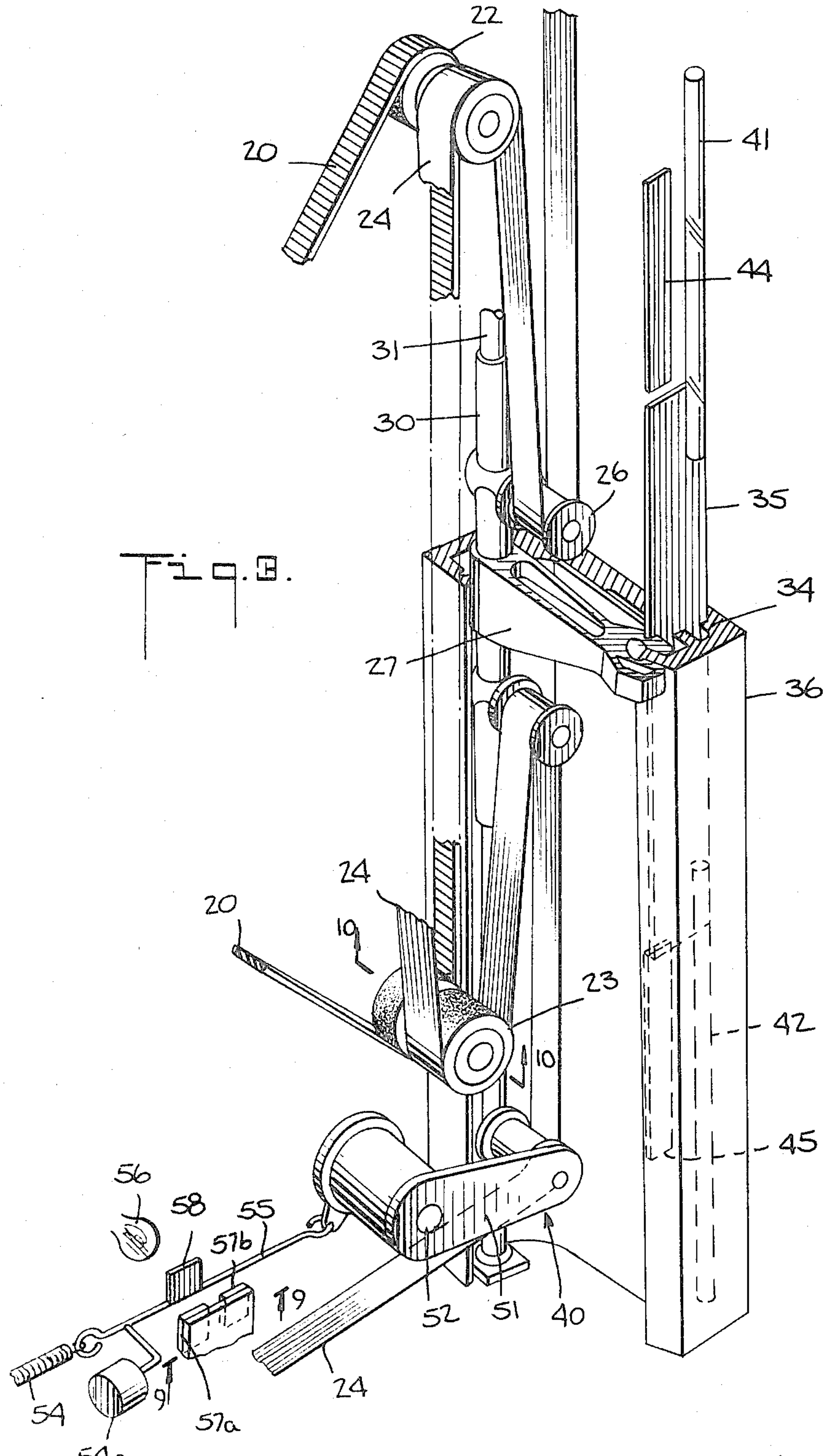
FIG. 8 is an enlarged vertical view taken along the line 8—8 of FIG. 6 and illustrating the incandescent light source for the sensing assembly.

In order to detect the position of the carriage assembly 27, sensing means are mounted i5 the frame 36 (FIG. 5 and 6). In this manner, the position of the carriage with respect to a central position thereof such as that adjacent the magnetic head assembly or operational zone 39 (FIG. 1) is continually detected. The sensing means includes a pair of incandescent lamps 41 and 42 (FIG. 6) equally spaced from and mounted on opposite sides of the central position of the slider assembly. The incandescent lamps 41 and 42 are fixed within a slot 43 (FIG. 5) provided in the frame 36. Each of the lamps 41 and 42 is a commercially available incandescent lamp and contains an expansion spring 46 therein to compensate for temperature variations (FIG. 8). Disposed opposite each of the incandescent lamps is a photoelectric cell 44 and 45 which monitors the signal emitted from each of the lamps. The photoelectric cells 44 and 45 are coupled to the DC drive motors 14 and 15. The photocells may be formed of selenium oxide material. Such material is quite sensitive to red light. Thus lamps 41 and 42 can be operated with red temperatures for long lamp life and yet give sufficient light levels to activate the photocells.

As the shutter member 35 of the carriage assembly interrupts the beam of light between either of the lamps and photocells, the signal generated by the photocells changes and in turn provides a signal to control the motors as will be more fully discussed hereinbelow.

A tape length sensing assembly is provided at 40 just prior to the tape being routed onto the takeup reel 12 (FIG. 1). The tape length sensing assembly includes an arm 51 pivotable about point 52 (FIG. 2). In response to the length of tape between the takeup reel 12 and the tape loop, arm 51 pivots and produces a control signal which is employed in controlling drive motors 14 and 15 to maintain a desired level of tape. A lever 55 couples the pivotable arm 51 to spring 54 which may have an air or a viscous fluid dashpot 54*a* coupled thereto to provide damping to the arm.

Figure 9:
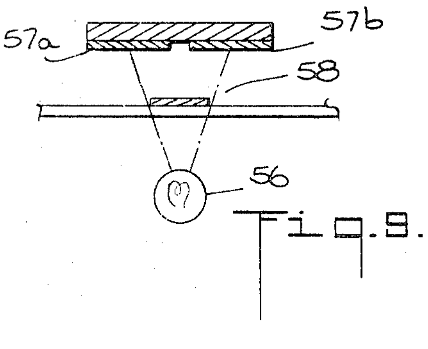
FIG. 9 is an enlarged fragmentary horizontal section view of the tape length sensing means taken along the line 9—9 of FIG. 3.

To sense the response of the area 51, lamp 56 is provided opposite a pair of photoelectric cells or photocells 57*a* and 57*b* with connecting lever 55 interposed therebetween. Additionally, a positioning block 58 if mounted on the lever 55. The block is adapted to vary the transmission of light to the photocells in response to the movement of the lever 55. When the tape length sensing system is in the null position which corresponds to a predetermined length of tape in the system, block 58 shades a portion such as one-half the area of each of the photocells 57*a* and 57*b* (FIG. 9). As the block 58 moves with respect to the light source, one of the photocell signals is varied as the light is applied to it and in turn delivers a varying signal to the tape supply and takeup drive motors 14 and 15 to control their torque and thereby the tape length in the system. It is noted that the signals from either of the tape length sensing means or the carriage position sensor could be directed solely to one of the reel drive motors 14 and 15 if response time was not critical.

Prior to operation, the tape from supply reel 11 is first threaded over idler 22 and then about idler 26 of the carriage. The carriage is held during threading by spring clip 60. The tape is next routed through the machine as previously described and illustrated in FIG. 2. Another spring clip 61 is located in the lower portion of frame 36, with the tape being routed thereover prior to being passed across the tape length sensing means and onto the takeup reel. Once so threaded, the machine is ready for operation.

SENSING CIRCUITRY

There is disclosed above a freely slidable carriage assembly that isolates the movement of tape in a capstan-driven loop from the movement of the rest of the tape. The carriage moves up or down a distance equal to one-half the length of tape by which the takeup of tape lags or leads respectively the movement of tape in the capstan-driven loop. In control system terminology, the position of the carriage is equal to one-half the time integral of the difference between the tape speed at the reels (since the carriage does not actually store any tape, the tape speed at both reels is the same at all times, neglecting tape elasticity and tape length sensor movement) and the tape speed in the capstan loop.

Figure 11:
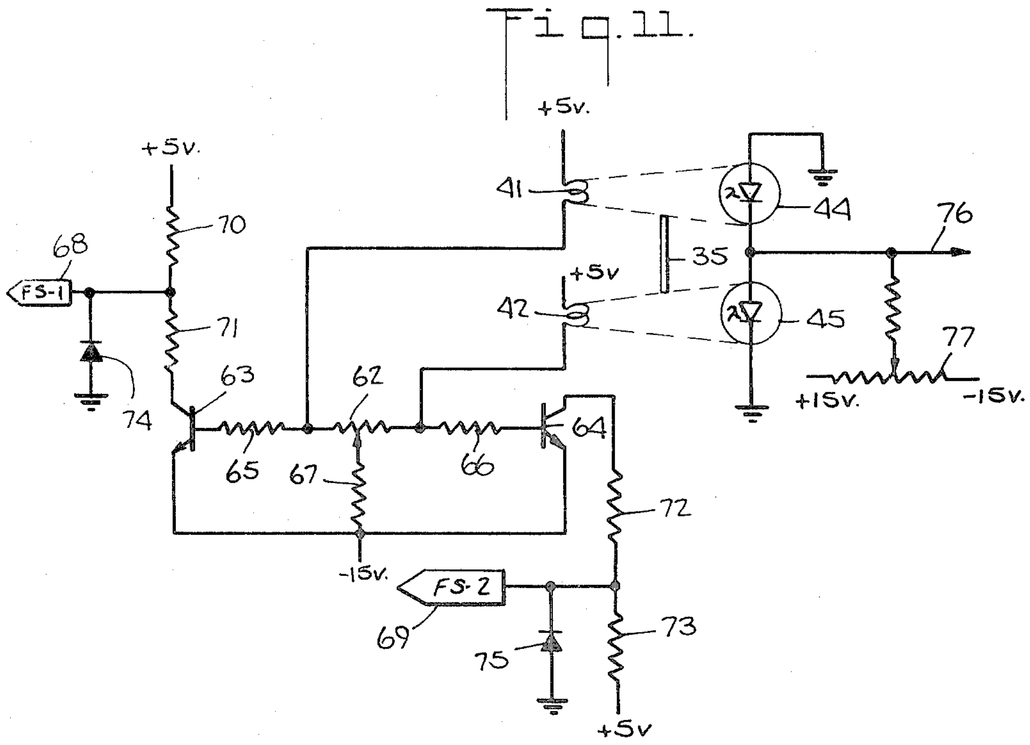
FIG. 11 is a schematic representation of the carriage position sensing circuit.

The position of the carriage assembly is continuously detected by the carriage position sensor circuit, shown schematically in FIG. 11. When the lamps are functioning normally, the relative intensity of lamps 41 and 42 (FIG. 3) may be balanced by adjusting potentiometer 62 (FIG. 11). Transistors 63 and 64 are normally turned on through resistors 65 and 66 by the voltage drop through potentiometer 62 and resistor 67 which pulls down the voltage potentials at outputs 68 and 69. Resistors 70, 71, 72 and 73 cooperate with clamp diodes 74 and 75 to produce a ground potential at outputs 68 and 69. If either lamp fails, the associated transistor will be turned off and the associated output potential will rise to approximately 5 volts, thereby making a signal indication of a failure condition. When an output voltage rises substantially above ground potential as a result of a failure, the entire transport system is automatically stopped as will be shown later. Thus the position sensor circuit is provided with a fail-safe characteristic.

Photovoltaic cells 44 and 45 are connected in series as shown in FIG. 11 and respond to the light energy coming from lamps 41 and 42 respectively. Output 76 is assumed to be at ground potential since it is connected to an input terminal of an operational amplifier as will be shown later. As the carriage assembly moves upward from its center position, the shutter assembly 35 increasingly shields photocell 44 from the light energy generated by lamp 41 so the current passing through photocell 44 decreases. Since photocell 45 remains unshielded when the carriage is above center position, the current passing through photocell 45 remains constant, resulting in an increasingly negative current (inward toward the photocells) at the output 76. The reverse occurs when the carriage moves increasingly below the center position, resulting in an increasingly positive current at the output 76. The photocell currents are balanced with potentiometer 77 so that there is no current at output 76 when the carriage is at the center position. Since the current at output 76 is thus proportional to the carriage position, it electrically represents the aforesaid integral or the length of tape by which the reels collectively lead or lag the length of tape driven by the capstan.

Figure 12:
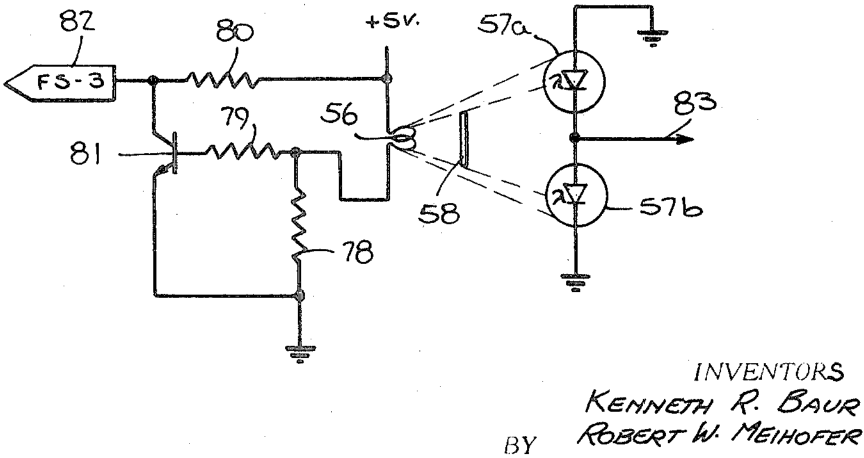
FIG. 12 is a schematic representation of the tape length sensing circuit.

The tape length sensor circuitry shown in FIG. 12 operates in a fashion analogous to the carriage sensor circuitry. Since only one lamp 56 is used in this sensor, the fail-safe circuitry is simplified. Resistors 78, 79 and 80 are selected to cause transistor 81 to be energized and the voltage at the fail-safe output 82 to be approximately at ground potential when the lamp 56 is operating normally. If lamp 56 fails, the transistor 81 will be turned off and the fail-safe output 83 will rise to approximately 5 volts.

Photovoltaic cells 57*a* and 57*b* are connected in series as shown. If the tape length between the reels increases from the predetermined or nominal length corresponding to the null condition of the tape length sensor, photocell 57*b* becomes increasingly exposed to light energy while photocell 57*a* becomes increasingly shielded from light energy as explained earlier. The increasing current through photocell 57*b* and decreasing current through photocell 57*a* causes increasingly negative current at the output 83. If the tape length decreases below the nominal length, the reverse occurs resulting in increasingly positive current at the output 83. At the nominal tape length both photocells are halfway shielded so there is no current (null) at the output 83.

CAPSTAN DRIVE CIRCUITRY

Figure 13:
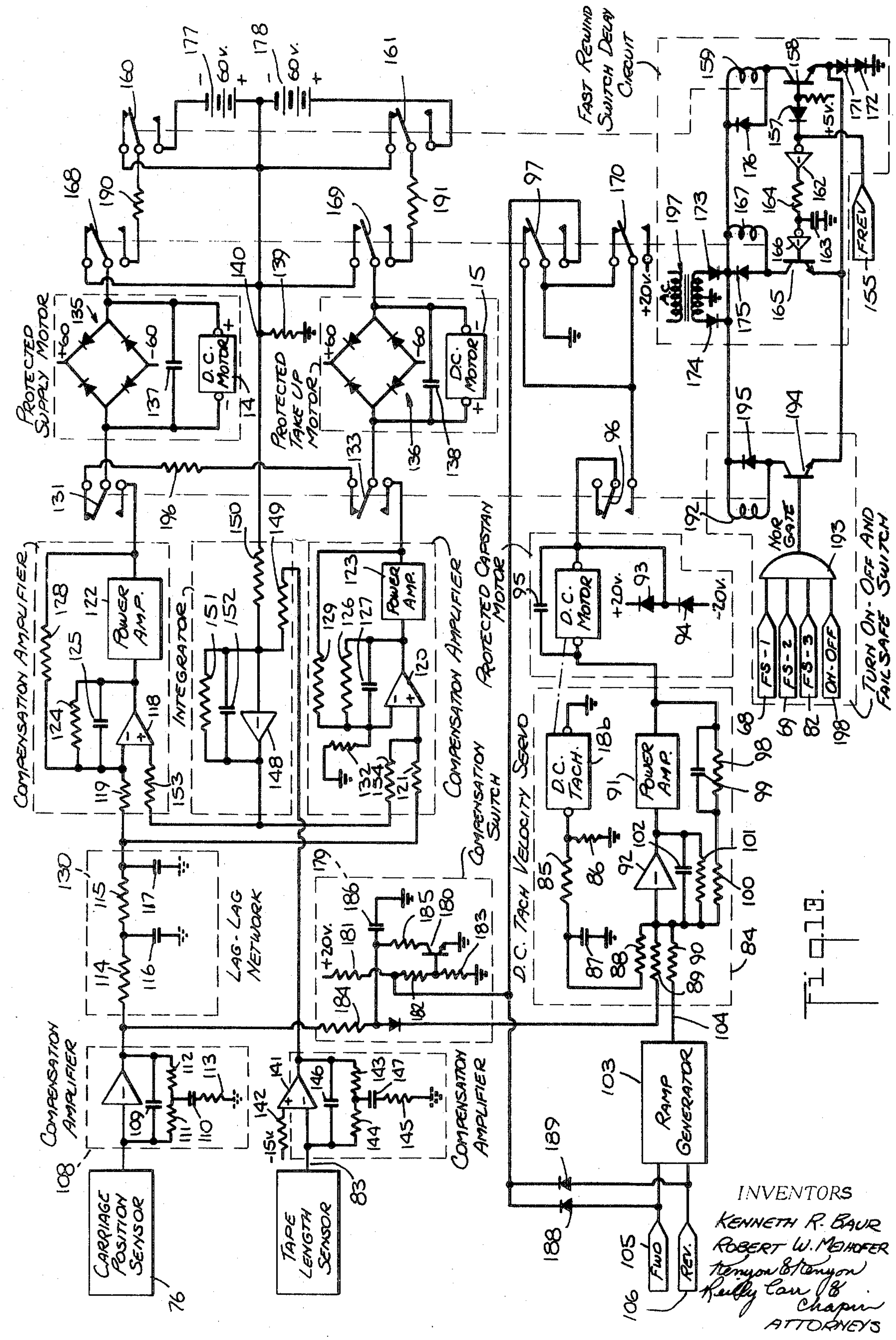
FIG. 13 is a combined circuit and block diagram of the control system.

Referring now to FIG. 13, the capstan drive motor 18 has a tachometer sensor output 18*a* for use in a DC tachometer velocity servo circuit 84. Briefly, the tachometer output, which is proportional to the capstan drive motor angular velocity, is processed through a compensation network of resistors 85 and 86 and capacitor 87 and compared through resistor 88 to one of the two inputs applied through summing resistors 89 or 90 depending upon the operating mode. The difference signal is applied to power amplifier 91 through operational amplifier 92 to drive the capstan motor 18. Diodes 93 and 94 protect the motor 18 from high self-induced voltages during switching transients and capacitor 95 suppresses arcing when switching relay contacts 96 and 97. Feedback elements 98, 99, 100, 101 and 102 are selected to obtain suitable transient response from the DC tachometer velocity servosystem. The servosystem operates to hold the capstan drive motor angular velocity to a value represented by the sum of the input voltages (one of which is always ground potential). In normal forward or normal reverse mode the input current through resistor 89 is 0. The capstan motor speed follows the input voltage applied from ramp generator 103. Since the circuit details of the ramp generator are well understood by those skilled in the art, a brief operational description should suffice. Briefly, the voltage at output 104 drops or rises at a constant rate (ramp slope) when the input 105 or 106, respectively, is switched on. When the output voltage reaches a specified level, it remains at that level until the input is switched off. Then the output voltage at 104 drops or rises at the same rate (ramp slope) to ground potential. The "on" levels are precisely regulated and held constant so the capstan motor speed will also be held constant during normal operation. Input 107 is used during fast reverse mode and will be discussed under that heading.

REEL MOTOR CONTROL SYSTEM

Referring again to FIG. 13, the carriage sensor circuit output 76 drives a negative (phase-inverting) input of operational amplifier 108 around which is a lead-lag-lag feedback compensation network comprising capacitors 109 and 110 and resistors 111, 112 and 113. The breakpoints of the feedback compensation network are selected to provide suitable transient response in the reel motor servo loops, the precise selection of which depends upon the other transfer functions in the loops, especially the transfer functions of the particular reel motors employed as will be apparent to one skilled in the art. The output voltage of operational amplifier 108 is further processed through a lag-lag compensation network of resistors 114 and 115 and capacitors 116 and 117. The breakpoints of this compensation network are chosen to sharply filter out lamp filament flicker transients that are produced by most incandescent lamp-photocell sensor combinations.

The output of this compensation network drives a negative (phase-inverting) input of operational amplifier 118 through resistor 119 and a positive (nonphase-inverting) input of operational amplifier 120 through resistor 121. The output signals of operational amplifiers 118 and 120 drive power amplifiers 122 and 123 respectively. Feedback compensation is provided around operational amplifier 118 by resistor 124 and capacitor 125 and around operational amplifier 120 by matching resistor 126 and matching capacitor 127. The breakpoint of these log filters is chosen to further improve transient response in the reel motor servo loops, the precise determination of which depends upon the rest of the transfer functions in the loops including the transfer functions of the lead-lag-lag compensation network (previously described), the lag-lag compensation network (previously described) and the reel motors themselves. Feedback resistors 128 and 129 provide drift stabilization for DC amplifiers 122 and 123 and stabilize and adjust the forward gain through the compensation amplifiers. Resistor 132 is needed to provide proper feedback gain, as will be understood by one skilled in this art.

Supply reel motor 14 is driven by power amplifier 122 through energized relay contact arm 131 and takeup reel motor 15 is driven by power amplifier 123 through energized relay contact arm 133.

Diode bridges 135 and 136 are required to protect the motors from damagingly high self-induced voltages during relay switching transients and during possible open-circuit-type failures. Capacitors 137 and 138 are used to suppress relay contact arcing. The reel motors are connected in circuit with a phase reversal to compensate for the signal phase reversal that has been introduced between operational amplifier 118 (negative input) and operational amplifier 120 (positive input), i.e., the negative terminal of the supply reel motor 14 is connected to the output terminal of power amplifier 122 while the positive terminal of the takeup reel motor 15 is connected to the output terminal of power amplifier 123. The positive terminal of motor 14 and the negative terminal of motor 15 are connected to ground through a common resistor 139. A positive signal at the output of the compensation network 130 accordingly results in a forward rotation of each reel motor even though the current and voltage at the output of amplifier 122 is negative and the current and voltage at the output of amplifier 123 is positive.

Resistor 139 sums the currents through the two reel motors. Since the motors are connected with phase reversal, the negative current through motor 122 is subtracted from the positive current through motor 123. The resulting current through resistor 139 is the difference between the two motor currents with the phase sense of the larger of the two motor currents.

The voltage on line 140 developed across resistor 139 is therefore proportional to the difference in reel motor currents. The difference between the motor currents is known to be a rough measure of the tape tension produced by the motors. At constant tape tension the difference between the motor currents is highest when the amount of tape on each reel is equal and drops slightly as the difference between the amount of tape on each reel increases. If the difference between the motor currents is held constant by a servosystem, the tape tension decreases slightly as the amount of tape on the reels tends to become equal and increases slightly in a symmetrical fashion as the amount of tape on the reel becomes increasingly different. The preferred embodiment incorporates a servosystem of this type.

The signal at tape length sensor output 83 is applied to a negative (phase-inverting) input of operational amplifier 141. A constant negative current is also applied to amplifier 141 through resistor 142. High-frequency transient components are filtered out by the lead-lag-lag feedback network comprising resistors 143, 144 and 145 and capacitors 146 and 147. The breakpoints of this network are chosen to provide adequate system response to tape length transients.

The output of amplifier 141 is applied to operational amplifier 148 through summing resistor 149. The voltage signal on line 140 is also applied to amplifier 148 through summing resistor 150. Resistor 151 is chosen suitably high so that the feedback capacitor 152 around amplifier 148 converts the operational amplifier into an integrating amplifier. Resistor 151 functions to slowly discharge capacitor 152 when the system is switched off. The output voltage of the integrator is applied through summing resistors 153 and 154 to positive inputs at operational amplifiers 118 and 120 respectively.

NORMAL FORWARD—NORMAL REVERSE

In normal forward mode the steady-state position of the sliding carriage is slightly above center as viewed in FIG. 1 causing a negative current at the carriage sensor output 76, a positive voltage at the output of compensation amplifier 108, a positive voltage at the output of the lag-lag network 130 and positive currents through summing resistors 119 and 121 (FIG. 13). The output of the integrating amplifier 148 is positive.

Operational amplifier 120 sums the positive currents through resistors 121 and 154 and produces a positive output voltage proportional to the sum. Operational amplifier 118 subtracts the positive current through resistor 119 from the positive current through resistor 153 and produces an output voltage proportional to the algebraic difference, which in normal forward mode is negative and less in absolute value than the voltage output of amplifier 120.

Accordingly, takeup motor 15 has a high armature current than supply motor 14. Current passes into the positive terminal of each reel motor, however, so both are driven forward. The difference between the two armature currents is positive (because the takeup motor current is higher) producing a positive voltage at line 140.

If the tape between the reels has the predetermined length, the current at output 83 is 0. Negative bias current through resistor 142 produces a negative bias voltage at the output of amplifier 141. When steady-state conditions prevail, the resulting negative current through summing resistor 149 exactly matches the positive current coming through summing resistor 150 from the voltage on line 140. Since the algebraic sum of currents into the summing node of operational amplifier 148 is 0 at steady-state conditions, the output voltage of the integrator amplifier 148 does not change.

If the tape between the reels is abnormally long a positive current at tension sensor output 83 results, causing the output of amplifier 141 to become negative. The higher negative current through resistor 149 would cause the output voltage of the integrator to increase at a rate proportional to the current imbalance at the summing node of amplifier 148. The resulting higher current into amplifier 120 and 118 would increase the positive output voltage of amplifier 120 and make the output voltage of amplifier 118 less negative. The takeup motor would accordingly develop higher forward torque while the supply motor would develop less forward torque resulting in a shortening of the tape between the reels. The change in motor current difference would be immediately sensed and the current balance at the summing node of amplifier 148 would tend to balance again but the tape length between the reels would be shorter. The shorter tape length between the reels is also sensed by the tape length sensor, and the resulting reduction in negative current through resistor 149 also tends to balance the currents at the node.

If the reels are not transporting tape quickly enough, the slider moves higher, the current at output 76 becomes more negative and the forward torque of both motors increases by an amount proportional to the position of the carriage. The resulting higher motor speeds tend to cause the carriage to return back toward the steady-state position (which is somewhat above center in normal forward mode).

The system operates symmetrically. In normal reverse mode, the polarity of all signal voltages and currents is reversed. Whether the tape reel drive motors operate forwardly or backwardly depends of course on the movement of the capstan loop. In normal mode the reel drive motors merely tend to hold the carriage within its operating limits of travel regardless of the drive direction necessary to accomplish this.

FAST REWIND

Fast rewind mode is initiated by ungrounding terminal 155 with a switch (not shown). Resistor 156 cooperates with diode 157 to turn on transistor 158. Current then flows through relay coil 159 which throws contact arms 160 and 161. The higher voltage at the input of logic inverter 162 drops the output voltage thereof to ground potential and capacitor 163 quickly discharges through a low resistance 164 until transistor 165 is switched on by logic inverter 166. Current then flows through relay coil 167 which throws contact arms 168, 169, 170 and 97. When input 155 is regrounded to end the fast reverse mode, relay 167 is delayed from turning off for a short period while capacitor 163 charges through resistor 164 and a larger resistor (not shown) within the logic inverter 162. The component values of capacitor 163, resistor 164 and resistor inside logic inverter 162 are selected to delay the deenergization of relay 167 long enough for the reel speeds to decrease to normal reverse speed. Full-wave rectifier diodes 173 and 174 cooperate with power supply secondary 197 to power the switch circuitry with unfiltered DC voltage that is independent of the possible failure regulated DC power supplies which power the remainder of the tape transport. This independence assures a controlled turnoff in the event of a system failure detected by the fail-safe circuitry to be later described. Diodes 171 and 172 provide a slight emitter bias to the transistors 158, 165 and 197 (described later) to improve turnoff speed. Diodes 167, 175 and 195 (described later) serve to clamp reverse induced voltages across the respective relay coils and therefore suppress inductive kick that could otherwise damage the transistor respectively connected in series therewith during a rapid turnoff.

After relays 159 and 167 have been energized, DC batteries (or floating power supplies) 177 and 178 have been switched in series with reel motors 130 and 132, respectively, as shown in FIG. 13. Each of these batteries acts to pull current through the motor armatures in a negative direction causing the motors to accelerate backwards. Simultaneously, the capstan drive motor 18 is driven backwards by the applied DC potential caused by the switching of contact arms 97 and 170.

Control of the capstan speed is exercised through switch 179. During normal modes, resistors 181, 182 and 183 cooperate to hold transistor 180 on. Resistors 184 and 185 cooperate to prevent current from passing through diode 187. In the fast rewind mode, however, contact arm 97 is thrown and ground potential is applied between resistors 182 and 183 turn off transistor 180, thus allowing current to pass through diode 187. Ground potential is also applied through diodes 188 and 189 to clamp inputs 105 and 106 to ground, thus turning off and holding off the ramp generator 103.

Control of capstan drive speed is thus transferred to the carriage sensor. The DC tachometer velocity servosystem increases the capstan speed in response to an increasing output voltage from amplifier 108. The voltage applied to the capstan motor 18 through contact arm 170 has an additive effect on capstan speed allowing the carriage to stabilize at a position closer to the center and allowing the use of an amplifier 91 that has less driving capability. Capacitor 186 and resistor 184 provide lag compensation in this loop. The breakpoint of this filter is chosen to provide suitable transient response in the capstan servo loop during fast rewind operation.

In fast rewind mode, control of the carriage position is also exercised through control of the reel motors. A rising carriage tends to slow down the reel drive motors as well as speed up the capstan motor, each of which tends to lower the carriage.

The tape length sensing servocontrol loop and the motor current tension sensing servocontrol loop are unaffected by the choice of operating mode. The difference in reel motor currents is still sensed by resistor 139 since the floating power supplies 177 and 178 are tied to ground through the resistor 139 as shown.

Fast rewind mode is terminated by regrounding terminal 155. Relay coil 159 immediately deenergized and contact arms 160 and 161 return to the deenergized position (shown). For a short period, relay coil 167 remains energized and reel motor currents reach resistor 139 through resistors 190 and 191. The resistors 190 and 191 act as dynamic brakes for the reel motors by helping to dissipate reel motor energies.

FAIL-SAFE CIRCUITRY

Relay coil 192 is normally energized. If a sensor lamp fails, it will cause one of the fail-safe outputs 68, 69 or 82 to rise from ground potential to approximately 5 volts as described above. Any such change in voltage will turn off NOR-gate 193 which in turn switches off transistor 194 and deenergizes relay coil 192. The relay coil 192 will obviously also be deenergized when the transport is turned off by ungrounding input 198. Diode 195 protects transistor 194 from a damaging inductive back voltage during the deenergization of coil 192 as described previously.

When coil 192 is deenergized, contact arm 96 open circuits the capstan motor 18 to quickly stop it. Simultaneously, contact arms 131 and 133 remove the power drive circuits from the reel motors and connect the reel motors together through resistor 196. Resistor 196 then functions as a dynamic brake to dissipate the reel motor energies quickly and stop the motors.

What is claimed is:

1. A tape transport having a tape head;

means for supporting a loop of tape with a portion thereof adjacent to the tape head, a pair of reversal portions located opposite one another, and a pair of end portions extending toward one another, each of the end portions extending from a different one of the reversal portions, the tape loop having a predetermined length between the reversal portions thereof;

means in engagement with the tape loop for driving the tape at a predetermined speed;

means for driving a tape supply reel to deliver tape to the tape loop;

additional means for driving a takeup reel for removing tape from the tape loop;

means for coupling to the loop the tape being delivered from the supply reel and being removed by the takeup reel, the coupling means enabling the tape in the tape loop to move at a velocity different than the velocity of the tape being delivered and removed;

means connected to the coupling means for sensing a function of a difference in velocity of the tape in the tape loop and the velocity of the tape being delivered and removed; and means responsive to the sensing means for controlling the means for driving the tape supply reel and the means for driving the takeup reel to supply and takeup tape in accordance with the tape requirements of the means for driving the tape;

the improvement in which said coupling means comprises:

an elongated guide member extending adjacent to the length of the tape loop, a carriage slidably mounted on the guide member for movement along the length thereof, and a pair of studs disposed on the carriage spaced apart from one another in the direction of movement of the carriage at an interval which is less than the predetermined length of the tape loop, each of the studs being adapted to engage and reverse the direction of the tape from a different one of the supply reel and takeup reel into the end portions of the tape loop, the engagement of the studs with the tape being adapted to cause the carriage to move along the guide member whenever the velocity of the tape in the tape loop is different from the velocity of the tape being delivered and removed, whereby the movement of the carriage along the guide member enables the tape-driving means to have a difference in velocity with respect to the velocity of the tape being delivered and taken up.

2. A tape transport in accordance with claim 1 in which said elongated guide member comprises a cylindrical rod and in which the carriage includes bearing means in engagement with the cylindrical rod for providing a sliding fit with respect thereto without any substantial amount of friction therebetween.

3. A tape transport in accordance with claim 2 in which the carriage includes a tubular portion through which the guide member extends with a radial clearance with respect thereto, and in which the bearing means comprises a sleeve of bearing material and having a sliding fit with respect to the guide member extending therethrough.

4. A tape transport in accordance with claim 1 in which the carriage is pivotally mounted with a sliding fit with respect to the guide means, the carriage having an arm extending therefrom, and further comprising an additional elongated guide member extending substantially parallel to said guide member and in sliding engagement with the arm of the carriage for maintaining the carriage in a predetermined position with respect to the guide member.

5. A tape transport in accordance with claim 1 in which the improvement in the means connected to the coupling means for sensing a function of the difference in velocity of the tape in the tape loop and the velocity of the tape being delivered and removed comprises:

a source of radiant energy mounted opposite one side of the carriage and photocell means mounted opposite the other side of the carriage, the photocell means having an output that varies with the amount of radiant energy striking the photocell means, whereby the position of the carriage is detected by the interruption of light in order to develop a signal which is a continuous function of the position of said carriage.

6. A tape transport in accordance with claim 5 in which the carriage includes a shutter member connected thereto for movement between the source of radiant energy and the photocell means, the shutter member being adapted to vary the amount of radiant energy received by the photocell means.

7. A tape transport in accordance with claim 5 in which the carriage is pivotally mounted with a sliding fit with respect to the guide means, the carriage having an arm extending therefrom, and further comprising an additional elongated guide member extending substantially parallel to said guide member and in sliding engagement with the arm of the carriage for maintaining the carriage in a predetermined position with respect to the guide member, the shutter member being connected to the arm.

8. A tape transport in accordance with claim 1, the improvement in the means in engagement with the tape loop for driving the tape at a predetermined speed comprising:

a plurality of capstans for engaging the tape being transported between the supply and the takeup reels;

an endless belt disposed about the plurality of capstans; and means for moving the endless belt to rotate the capstans to transport the tape to and from the tape head.

9. A tape transport in accordance with claim 8 in which the means in engagement with the tape loop for driving the tape at a predetermined speed further comprises a drive pulley member having the endless belt disposed thereabout, and in which each of the air of capstans is disposed on opposite sides of the tape head.

10. A tape transport in accordance with claim 1, the improvement further comprising:

means in engagement with the tape for sensing a change in the length of tape between the reels and the tape loop; and means responsive to the change in length-sensing means for additionally controlling the means for driving the tape supply reel and the means for driving the tape takeup reel to control the length of the tape between the reels and the tape loop to maintain the substantially predetermined nominal length of tape.

11. A tape transport in accordance with claim 10 in which the tape tension sensing means comprises:

a pivotally mounted arm about which the tape is disposed, resilient means for biasing the arm to apply tension to the tape, and photocell means disposed for sensing the position of the arm, the photocell means being operatively connected to the additional control means, whereby the amount of tension in the tape is controlled in accordance with the signal generated by the photoelectric sensing means.

12. In a tape transport having a loop of tape with a portion thereof adjacent to the tape head, a pair of reversal portions located opposite one another, and a pair of end portions extending toward one another, each of the end portions extending from a different one of the reversal portions, the tape loop having a predetermined length between the reversal portions, the improvement comprising:

means for coupling to the loop the tape being delivered from a supply reel and being removed by a takeup reel, the coupling means enabling the tape in the tape loop to move at a velocity different than the velocity of the tape being delivered and removed;

means connected to the coupling means for sensing a function of a difference in velocity of the tape in the tape loop and the velocity of the tape being delivered and removed;

means responsive to the sensing means for controlling the means for driving the tape supply reel and the means for driving the takeup reel to supply and takeup tape in accordance with the tape requirements of the means for driving the tape;

means in engagement with the tape for sensing a change in the length of the tape between the reels and the tape loop with respect to a substantially predetermined nominal length; and means responsive to the change in length-sensing means for additionally controlling the means for driving the length of the tape between the reels and the tape loop to maintain the substantially predetermined nominal length of tape.

13. In a tape transport in accordance with claim 12, the improvement in which said coupling means comprises:

an elongated guide member in the form of a cylindrical rod extending adjacent to the length of the tape loop, a carriage having a tubular portion slidably mounted on the guide member for movement along the length thereof, and a pair of studs disposed on the carriage spaced apart from one another in the direction of movement of the carriage at an interval which is less than the predetermined length of the tape loop, each of the studs being adapted to engage and reverse the direction of the tape from a different one of the supply reel and takeup reel into the end portions of the tape loop, the engagement of the studs with the tape being adapted to cause the carriage to move along the guide member whenever the velocity of the tape in the tape loop is different from the velocity of the tape being delivered and removed, whereby the movement of the carriage along the guide member enables the tape-driving means to have a difference in velocity with respect to the velocity of the tape being delivered and taken up.

14. In a tape transport in accordance with claim 12, the improvement in which the means connected to the coupling means for sensing a function of the difference in velocity of the tape in the tape loop and the velocity of the tape being delivered and removed comprises:

a source of radiant energy mounted opposite one side of the carriage and photocell means mounted opposite the other side of the carriage, the photocell means having an output that varies with the amount of radiant energy striking the photocell means, and in which the carriage includes a shutter member connected thereto for movement between the source of radiant energy and the photocell means, the shutter member being adapted to vary the amount of radiant energy received by the photocell means, whereby the position of the carriage is detected by the interruption of light in order to develop a signal which is a continuous function of the position of said carriage.

15. In a tape transport in accordance with claim 12, the improvement in which the means in engagement with the tape for sensing a change in the length of the tape between the reels and the tape loop with respect to a substantially predetermined nominal length comprises:

a pivotally mounted arm having a free end portion adapted to be disposed, resilient means for biasing the arm to apply a substantially constant tension to the tape, and photocell means disposed for sensing the position of the arm, the photocell means being operatively connected to the means responsive to the change in length-sensing means for additionally controlling the means for sensing the tape takeup reel to control the length of the tape between the reels and the tape loop, whereby the length of the tape between the reels and the loop is maintained equal to the substantially predetermined nominal length of tape in accordance with the signal generated by the photoelectric sensing means.

16. A method of controlling the operation of a takeup reel drive motor and a supply reel drive motor of a tape transport to control the speed at which tape is supplied to and taken from a tape loop that is capable of relative motion with respect to the remainder of the tape, in accordance with the requirements of a capstan driving the tape loop, comprising the steps of:

sensing a function of the difference between the speed at which tape is being driven through the tape loop by the capstan drive and the speed at which tape is being supplied and taken up by the reels;

sensing a function of the difference in torque between the takeup reel drive motor and the supply reel drive motor;

additionally sensing a function of the change in length of the tape between the tape reels and the tape loop with respect to a substantially predetermined nominal length;

controlling the difference in torque between the takeup reel drive motor and the supply reel drive motor in response to the sensed function of the difference in motor torque and the additionally sensed function of the change in the length of the tape; and additionally controlling the torque of both the takeup reel drive motor and the supply reel drive motor in response to the sensed function of the speed difference, whereby the tape requirements of the capstan drive tape loop are fulfilled and a desired tape tension is maintained.

17. A method as defined in claim 16 wherein the step of sensing a function of the difference in torque between the drive motors comprises sensing the difference between the currents driving the motors.

18. A method as defined in claim 17 wherein the step of controlling the difference in torque between the motors in response to the sensed difference between the currents driving the motors includes the step of determining the amount by which the difference in motor drive currents exceeds a predetermined reference difference.

19. A method as defined in claim 18 wherein the step of controlling the difference in torque between the motors includes the step of determining the time integral of the amount by which the difference in motor drive currents exceeds the predetermined reference difference.

20. A method as defined in claim 19 wherein the step of controlling the difference in torque between the motors includes the step of increasing the drive current of one motor and decreasing the drive current of the other motor by an amount substantially proportional to the time integral.

21. A method as defined in claim 16 wherein the step of additionally sensing a function of the change in length of the tape between the tape reels and the tape loop with respect to a substantially predetermined nominal length comprises sensing the amount of deflection of a resiliently mounted member about which the tape passes.

22. A method as defined in claim 16 wherein the step of additionally sensing a function of the change in length of the tape between the tape reels and the tape loop with respect to a substantially predetermined nominal length comprises sensing the difference of the tape length between the tape reels and the tape loop with respect to a reference tape length.

23. A method as defined in claim 22 wherein the step of controlling the difference in torque between the motors includes the step of determining the time integral of the difference between the sensed tape length and the reference tape length.

24. A method as defined in claim 23 wherein the step of controlling the difference in torque between the motors includes the step of increasing the drive current of one motor and decreasing the drive current of the other motor by an amount substantially proportional to the time integral.

25. A method as defined in claim 16 wherein the step of sensing a function of the difference between the tape speeds comprises sensing the time integral of the difference between the tape speeds.

26. A method as defined in claim 25 wherein the step of sensing the time integral comprises sensing the position of a movable carriage.

27. A method as defined in claim 25 wherein the step of additionally controlling the torque of both motors includes the step of increasing the drive current of both motors by an amount substantially proportional to the sensed time integral.

28. A method of controlling the operation of a takeup reel drive motor and a supply reel drive motor of a tape transport to control the speed at which tape is supplied to and taken from a tape loop that is capable of relative motion with respect to the remainder of the tape, in accordance with the requirements of a capstan driving the loop, comprising the steps of:

sensing a function of the difference between the speed at which tape is being driven through the loop by the capstan drive and the speed at which tape is being supplied and taken up by the reels;

sensing a function of the difference in torque between the takeup reel drive motor and the supply reel drive motor;

controlling the difference in torque between the takeup reel drive motor and the supply reel drive motor in response to the sensed function of the difference in motor torque; and additionally controlling the torque of both the takeup reel drive motor and the supply reel drive motor in response to the sensed function of the speed difference, whereby the tape requirements of the capstan drive loop are fulfilled.

29. A method as defined in claim 28 wherein the step of sensing a function of the difference in torque between the drive motors comprises sensing the difference between the currents driving the motors.

30. A method as defined in claim 28 wherein the step of sensing a function of the difference in torque between the drive motors comprises sensing the amount of deflection of a resiliently mounted member about which the tape passes.

31. A method of controlling the operation of a capstan drive motor of a tape transport in a fast rewind mode to control the speed at which a capstan drives tape through a tape loop which is capable of relative motion with respect to the remainder of the tape, in accordance with the fast rewind tape requirements of the tape reels, comprising the steps of:

sensing a function of the difference between the speed at which tape is being driven through the loop by the capstan and the speed at which tape is being supplied and taken up by the tape reels; and controlling the speed of the capstan motor in response to the sensed function of the speed difference, whereby the fast rewind tape requirements of the tape reels are fulfilled.

32. A method as defined in claim 31 wherein the step of sensing a function of the difference between the tape speeds comprises sensing the time integral of the difference between the tape speeds.

33. A method as defined in claim 32 wherein the step of sensing the time integral comprises sensing the position of a movable carriage.

34. A method as defined in claim 31 wherein the step of controlling the speed of the capstan motor includes the step of increasing the drive current of the capstan motor by an amount substantially proportional to the sensed time integral.

35. In a tape transport wherein tape is transported from a supply reel driven by a supply reel motor to a takeup reel driven by a takeup reel motor through a tape loop driven by a capstan motor which tape loop is capable of limited relative movement with respect to the remainder of the tape, the improvement comprising:

first sensing means for detecting the amount of tape by which the capstan loop has moved relative to the remainder of the tape;

second sensing means for detecting the amount by which the difference between the torque applied to the takeup reel and the torque applied to the supply reel exceeds a predetermined reference difference;

integrating means responsive to the second sensing means for determining the negative time integral of the amount sensed by the second sensing means;

takeup reel motor drive means proportionally responsive to the first sensing means and also proportionally responsive to the integrating means for applying a torque to the takeup reel; and supply reel motor drive means proportionally responsive to the first sensing means and also proportionally responsive negatively to the integrating means for applying a torque to the supply reel, whereby the tape is transported from the supply reel to the takeup reel at substantially constant tension and at a speed that varies with the speed of the capstan loop to limit the relative movement.

36. A tape transport as defined in claim 35 having the tape loop linked to the remainder of the tape by a carriage movably responsive to movement of the tape loop relative to the remainder of the tape, wherein the first sensing means comprises sensing means for detecting the position of the carriage relative to a predetermined position.

37. A tape transport as defined in claim 35 wherein the second sensing means comprises means for detecting the amount by which the difference between the current driving the takeup reel motor and the current driving the supply reel motor exceeds a predetermined difference.

38. A tape transport as defined in claim 35 having a resiliently mounted member about which the tape passes, wherein the second sensing means comprises means for detecting the amount by which the member is deflected relative to a predetermined position.

39. A tape transport as defined in claim 35 having a fast rewind mode and further comprising means proportionally responsive to the first sensing means for driving the capstan motor, whereby the tape is transported through the loop at a speed that varies with the speed of the remainder of the tape to limit the relative movement.

40. A tape transport as defined in claim 39 having the tape loop linked to the remainder of the tape by a carriage movably responsive to movement of the tape loop relative to the remainder of the tape, wherein the first sensing means comprises sensing means for detecting the position of the carriage relative to a predetermined position.

* * * * *

UNITED STATES PATENT OFFICE
CERTIFICATE OF CORRECTION

Patent No. 3,637,161 Dated January 25, 1972

Inventor(s) Kenneth R. Baur et al.

It is certified that error appears in the above-identified patent and that said Letters Patent are hereby corrected as shown below:

Column 1, line 14, "vary" should be -- very --.

Column 1, line 39, "column" should be -- volume --.

Column 4, line 13 "15" should be -- in --.

Column 8, line 9, "high" should be -- higher --.

Column 11, line 50, "air" should be -- pair --.

Signed and sealed this 22nd day of August 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
U.S. GOVERNMENT PRINTING OFFICE : 1969 O—366-334